(12) United States Patent
Hsu

(10) Patent No.: US 11,803,114 B2
(45) Date of Patent: Oct. 31, 2023

(54) ILLUMINATION SYSTEM AND PROJECTION APPARATUS

(71) Applicant: Coretronic Corporation, Hsin-Chu (TW)

(72) Inventor: Ku-Hui Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/892,104

(22) Filed: Aug. 21, 2022

(65) Prior Publication Data

US 2023/0062472 A1    Mar. 2, 2023

(30) Foreign Application Priority Data

Sep. 1, 2021 (CN) .......................... 202111019672.3

(51) Int. Cl.
*G03B 21/20* (2006.01)
*G02B 27/28* (2006.01)
*G03B 33/12* (2006.01)

(52) U.S. Cl.
CPC ....... *G03B 21/2033* (2013.01); *G02B 27/283* (2013.01); *G03B 21/208* (2013.01); *G03B 21/2013* (2013.01); *G03B 21/2066* (2013.01); *G03B 21/2073* (2013.01); *G03B 33/12* (2013.01)

(58) Field of Classification Search
CPC ............ G03B 21/2033; G03B 21/2066; G03B 21/2073; G03B 21/208; G03B 33/12; G02B 27/283
USPC .......................................................... 353/31
See application file for complete search history.

(56) References Cited

U.S. PATENT DOCUMENTS

2014/0092364 A1\* 4/2014 Janssens ................ G03B 35/26
353/8

FOREIGN PATENT DOCUMENTS

CN     111176059     5/2020
CN     111290089     6/2020

\* cited by examiner

*Primary Examiner* — Jerry L Brooks
(74) *Attorney, Agent, or Firm* — JCIPRNET (57) ABSTRACT

An illumination system includes first and second red light sources, first and second green light sources, first and second blue light sources, and a first light-splitting device. The first red light source, the first green light source, and the first blue light source respectively provide a first red light beam, a first green light beam, and a first blue light beam with a first polarization state. The second red light source, the second green light source, and the second blue light source respectively provide a second red light beam, a second green light beam, and a second blue light beam with a second polarization state. The first light-splitting device is disposed on transmission paths of the first and second red light beams, the first and second green light beams, and the first and second blue light beams to form an illumination beam.

20 Claims, 6 Drawing Sheets

ILLUMINATION SYSTEM AND PROJECTION APPARATUS

CROSS-REFERENCE TO RELATED APPLICATION

This application claims the priority benefit of China application serial no. 202111019672.3, filed on Sep. 1, 2021. The entirety of the above-mentioned patent application is hereby incorporated by reference herein and made a part of this specification.

BACKGROUND OF THE INVENTION

1. Field of the Invention

The invention relates to an optical apparatus; more particularly, the invention relates to an illumination system and a projection apparatus.

2. Description of Related Art

A projection apparatus is a display apparatus configured to generate large-size images. With the evolution and innovation of science and technology, the projection apparatus has been continuously improving. An imaging principle of the projection apparatus is to convert an illumination beam generated by an illumination system to an image beam through a light valve, and the image beam is then projected to a projection target (e.g., a screen or a wall surface) through a projection lens to form a projection image.

In addition, the illumination system has also evolved to an advanced laser diode (LD) light source from an ultra-high-performance (UHP) lamp and a light-emitting diode (LED) in response to the market demands for brightness, color saturation, life span, toxic-free and environmental requirements of the projection apparatus. In a light-combining system of a single-chip light valve RGB laser projector, each laser beam requires a dedicated light-combining module for light combination, light of different wavelengths is mixed on light paths, and the mixed light then enters a light-homogenizing apparatus, so as to be shaped and homogenized. Said architecture requires three lens assemblies of monochromatic light-combining modules and two dichroic light-splitting mirrors to mix the light of different wavelengths, and therefore the required devices are significant in number and occupy a large area. If a normal reflective mirror is applied to combine monochromatic laser beams, the number of applicable laser beams is insufficient due to volume constraints. In addition, the laser beams may lead to a severe laser speckle phenomenon on a display screen, and such an issue is to be resolved by applying a relatively large diffusion sheet, which greatly reduces an optical utilization efficiency of the system.

The information disclosed in this BACKGROUND OF THE INVENTION section is only for enhancement of understanding of the background of the described technology and therefore it may contain information that does not form the prior art that is already known to a person of ordinary skill in the art. Further, the information disclosed in the BACKGROUND OF THE INVENTION section does not mean that one or more problems to be resolved by one or more embodiments of the invention was acknowledged by a person of ordinary skill in the art.

SUMMARY OF THE INVENTION

The invention provides an illumination system and a projection apparatus capable of mitigating a laser speckle phenomenon of a projection image and enhance a light source utilization efficiency.

Other objectives and advantages of the invention may further be learned from technical features disclosed in the invention.

In order to achieve one or a part or all of the foregoing objectives or other objectives, an embodiment of the invention provides an illumination system that includes a first red light source, a second red light source, a first green light source, a second green light source, a first blue light source, a second blue light source, a first light-splitting device, and a light-homogenizing device. The first red light source is configured to provide a first red light beam with a first polarization state. The second red light source is configured to provide a second red light beam with a second polarization state. The first green light source is configured to provide a first green light beam with the first polarization state. The second green light source is configured to provide a second green light beam with the second polarization state. The first blue light source is configured to provide a first blue light beam with the first polarization state. The second blue light source is configured to provide a second blue light beam with the second polarization state. The first light-splitting device is disposed on transmission paths of the first red light beam, the second red light beam, the first green light beam, the second green light beam, the first blue light beam, and the second blue light beam and is configured to form an illumination beam. The light-homogenizing device is disposed on a transmission path of the illumination beam. Here, the first light-splitting device allows the first red light beam and the second red beam to pass but reflects the first blue light beam and the second blue beam or allows the first blue light beam and the second blue beam to pass but reflects the first red light beam and the second red light beam.

In order to achieve one or a part or all of the foregoing objectives or other objectives, an embodiment of the invention further provides a projection apparatus that includes an illumination system, at least one light valve, and a projection lens. The illumination system that includes a first red light source, a second red light source, a first green light source, a second green light source, a first blue light source, a second blue light source, a first light-splitting device, and a light-homogenizing device. The first red light source is configured to provide a first red light beam with a first polarization state. The second red light source is configured to provide a second red light beam with a second polarization state. The first green light source is configured to provide a first green light beam with the first polarization state. The second green light source is configured to provide a second green light beam with the second polarization state. The first blue light source is configured to provide a first blue light beam with the first polarization state. The second blue light source is configured to provide a second blue light beam with the second polarization state. The first light-splitting device is disposed on transmission paths of the first red light beam, the second red light beam, the first green light beam, the second green light beam, the first blue light beam, and the second blue light beam and is configured to form an illumination beam. The light-homogenizing device is disposed on a transmission path of the illumination beam. The at least one light valve is disposed on the transmission path of the illumination beam and configured to convert the illumination beam to an image beam. The projection lens is disposed on a transmission path of the image beam and configured to project the image beam out of the projection apparatus. Here, the first light-splitting device allows the first red light beam and the second red light beam to pass but reflects the first blue light beam and the second blue light beam or allows the first blue light beam and the second blue light beam to pass but reflects the first red light beam and the second red light beam.

In view of the above, one or more embodiments of the invention have at least one of the following advantages or effects. In the illumination system and the projection apparatus provided in one or more embodiments of the invention, the illumination system includes the first red light source, the second red light source, the first green light source, the second green light source, the first blue light source, and the second blue light source respectively configured to provide the first red light beam, the second red light beam, the first green light beam, the second green light beam, the first blue light beam, and the second blue light beam of different polarization states and generate the illumination beam by the light-splitting device. Thereby, combining light beams of the same wavelength but different polarization states may alleviate the laser speckle phenomenon of the projection image, and there is no need to utilize the diffusion sheet with high haze to improve the light-combining efficiency. In addition, the number of the light sources in the illumination system is twice the number of the light sources in the conventional illumination system, and therefore the light source utilization efficiency may be enhanced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
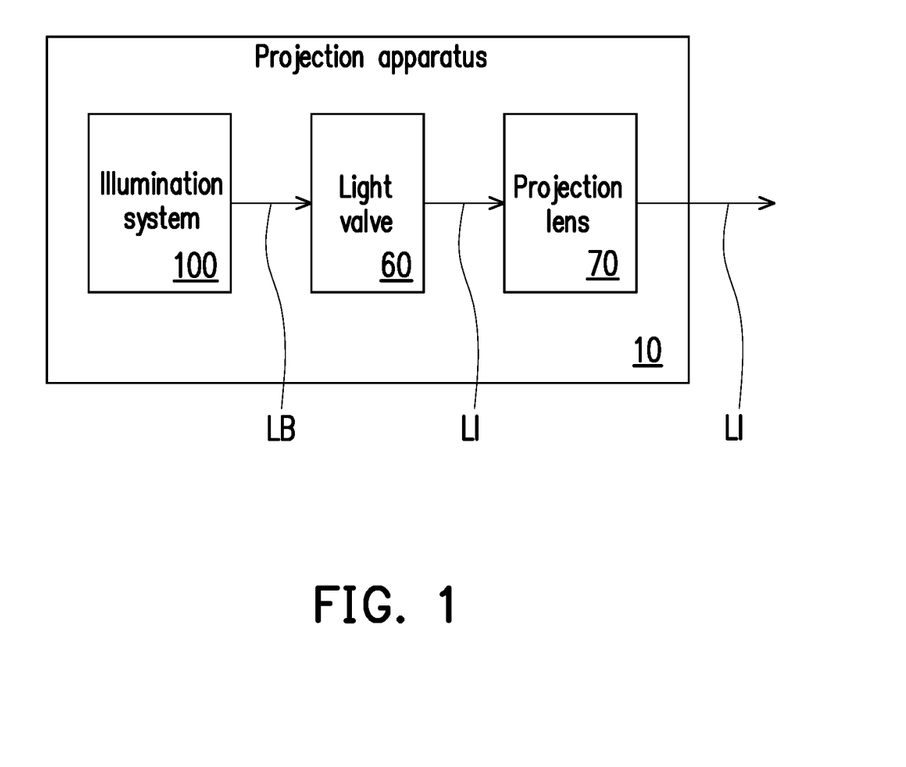
FIG. 1 is a schematic view of a projection apparatus according to an embodiment of the invention.

FIG. 1 is a schematic view of a projection apparatus according to an embodiment of the invention. With reference to FIG. 1, a projection apparatus 10 provided in this embodiment includes an illumination system 100, a light valve 60, and a projection lens 70. Here, the illumination system 100 is configured to provide an illumination beam LB. The light valve 60 is disposed on a transmission path of the illumination beam LB and configured to convert the illumination beam LB to an image beam LI. The projection lens 70 is located on a transmission path of the image beam LI and configured to project the image beam LI out of the projection apparatus 10 to a projection target (not shown), such as a screen or a wall surface.

In the present embodiment, the light valve 60 is, for instance, a reflective light modulator, such as a liquid crystal on silicon (LCOS) panel, a digital micro-mirror device (DMD), and so forth. In some embodiments, the light value 60 may also be a transmissive light modulator, such as a transparent liquid crystal panel, an electro-optical modulator, a magneto-optic modulator, an acousto-optic modulator (AOM), and so forth. The type and the form of the light valve 60 is not construed as limitations to the invention. The light valve 60 converts the illumination beam LB into the image beam LI, and teachings, suggestions, and implementation explanations of detailed steps and implementation manner of how the light valve 60 converts the illumination beam LB to the image beam LI may be derived from the common knowledge in the pertinent field and thus will not be further described hereinafter. In the present embodiment, the number of the light valve 60 is one, and the light valve 60 is, for instance, the projection apparatus 10 using one single DMD, but the number of the light value in other embodiments may be plural, which should however not be construed as a limitation to the invention.

The projection lens 70 includes, for instance, a combination of one or a plurality of optical lenses with refractive power, such as various combinations of non-planar lenses including biconcave lenses, biconvex lenses, concave-convex lenses, convex-concave lenses, plano-convex lenses, and plano-concave lenses. In an embodiment, the projection lens 70 may also include a planar optical lens which may convert the image beam LI from the light valve 60 to a projection beam LP in a reflective manner and projects the projection beam LP to a projection target. The form and the type of the projection lens 70 are not limited in the invention.

Figure 2:
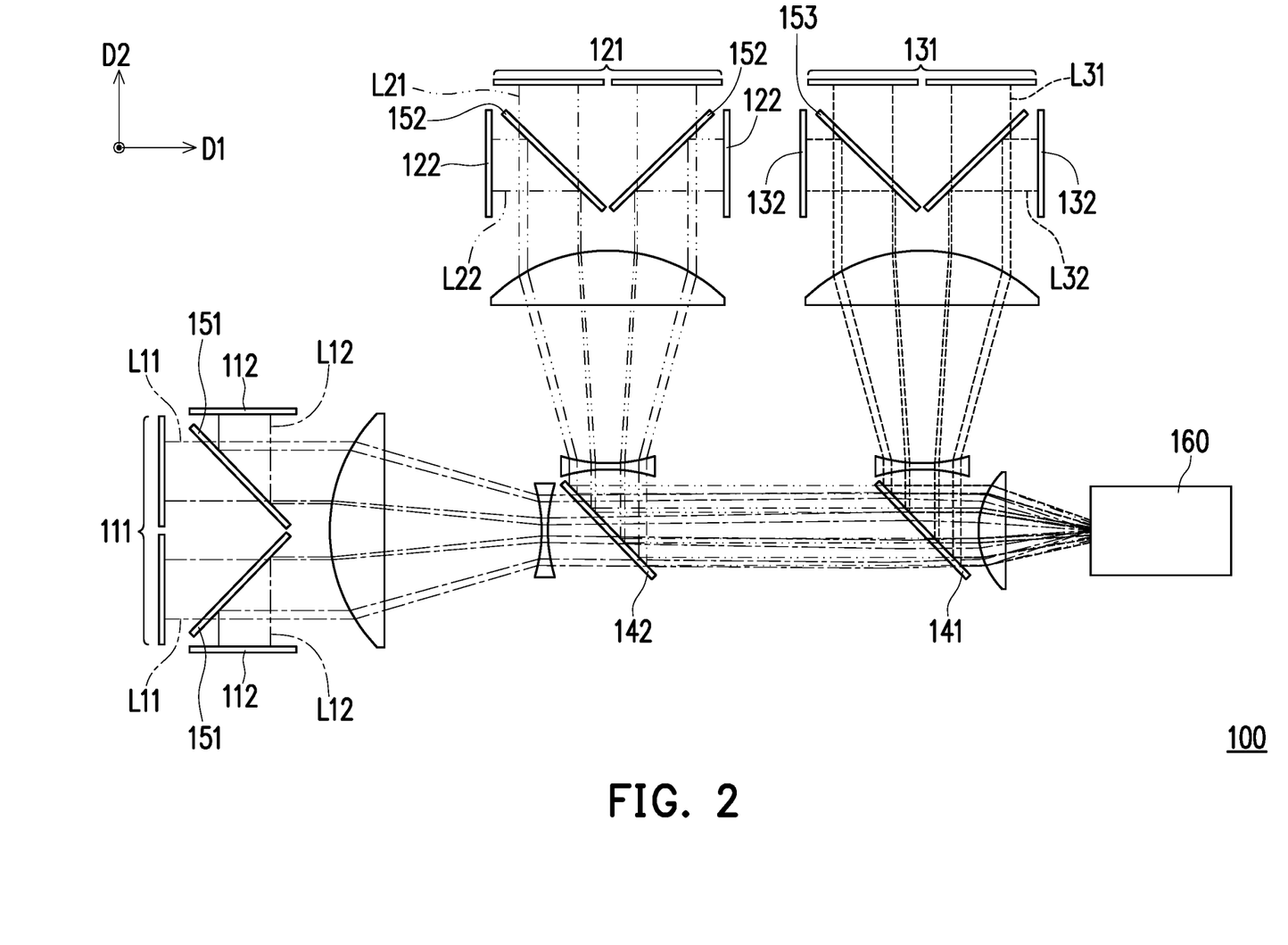
FIG. 2 is a schematic view of a projection apparatus according to another embodiment of the invention.

FIG. 2 is a schematic view of a projection apparatus according to another embodiment of the invention. With reference to FIG. 1 and FIG. 2, the illumination system 100, for instance, includes a light-emitting device, a wavelength-converting device, a light-homogenizing device, a filter device, and at least one light-splitting device, and the illumination system 100 is configured to provide light of different wavelengths to generate an illumination beam LB which acts as a source of image light. For instance, in the present embodiment, the illumination system 100 includes a first red light source 111, a second red light source 112, a first green light source 121, a second green light source 122, a first blue light source 131, a second blue light source 132, a first light-splitting device 141, and a light-homogenizing device 160.

Here, the first red light source 111 is configured to provide a first red light beam with a first polarization state L11. The second red light source 112 is configured to provide a second red light beam with a second polarization state L12. The first green light source 121 is configured to provide a first green light beam with the first polarization state L21. The second green light source 122 is configured to provide a second green light beam with the second polarization state L22. The first blue light source 131 is configured to provide a first blue light beam with the first polarization state L31. The second blue light source 132 is configured to provide a second blue light beam with the second polarization state L32. The first red light source 111, the second red light source 112, the first green light source 121, the second green light source 122, the first blue light source 131, and the second blue light source 132 are, for instance, laser diode (LD), and the first polarization state and the second polarization state are, for instance, an S polarization state and a P polarization state, respectively, which should however not be construed as limitations to the invention.

The first light-splitting device 141 is disposed on transmission paths of the first red light beam L11, the second red light beam L12, the first green light beam L21, the second green light beam L22, the first blue light beam L31, and the second blue light beam L32 and configured to form the illumination beam LB. The first light-splitting device 141 is, for instance, a light-splitting mirror that reflects the blue light beams but allows the red light beams and the green light beam to pass. In other words, in the present embodiment, the first light-splitting device 141 reflects the first blue light beam L31 and the second blue light beam L32 but allows the first red light beam L11, the second red light beam L12, the first green light beam L21, and the second green light beam L22 to pass. However, in different embodiments, according to different designs of light paths, the first light-splitting device 141 may have different transmittances in response to the light beams of different wavelengths, for instance, allowing the red light beams to pass but reflecting the blue light beams or allowing the blue light beams to pass but reflecting the red light beams, which should however not be construed as a limitation to the invention.

The light-homogenizing device 160 is disposed on the transmission path of the illumination beam LB and configured to adjust the shape of the light spot of the illumination beam LB, so that the shape of the light spot may conform to the shape of a working region of the light valve 60 (e.g., a rectangular shape), and that the light intensities on different regions of the light spot may be consistent or similar, which uniformizes the light intensity of the illumination beam LB. In the present embodiment, the light-homogenizing device 160 is, for instance, an integration rod, while the light-homogenizing device 160 in other embodiments may also be other appropriate types of optical devices, such as a lens array (a fly eye lens array), which should however not be construed as a limitation to the invention.

In view of said configuration, the illumination system 100 provided in this embodiment has light beams of the same wavelength but different polarization states, which may alleviate the laser speckle phenomenon of the projection image. In addition, the number of light sources provided in this embodiment is twice the number of light sources according to the related art, and hence a light source utilization efficiency may be enhanced in this embodiment.

The illumination system 100 may also include a first polarizing light-splitting device 151. The first polarizing light-splitting device 151 is disposed on a transmission path of the first red light beam L11 and a transmission path of the second red light beam L12 and configured to allow one of the first red light beam L11 and the second red light beam L12 to pass but reflect the other. Specifically, in the present embodiment, the first polarizing light-splitting device 151 is, for instance, a light-splitting mirror which reflects the light beams with the P polarization state but allows the light beams with the S polarization state to pass. Therefore, the first red light source 111 provides the first red light beam L11 along a direction parallel to a first direction D1, and the second red light source 112 provides the second red light beam L12 along a direction parallel to a second direction D2. The first direction D1 is perpendicular to the second direction D2. The first polarizing light-splitting device 151 reflects the second red light beam L12 but allows the first red light beam L11 to pass.

In addition, in the present embodiment, the illumination system 100 further includes a second polarizing light-splitting device 152 and a third polarizing light-splitting device 153. Here, the second polarizing light-splitting device 152 is disposed on a transmission path of the first green light beam L21 and a transmission path of the second green light beam L22 and configured to allow one of the first green light beam L21 and the second green light beam L22 to pass but reflect the other. To be specific, in the present embodiment, the second polarizing light-splitting device 152 is similar to the first polarizing light-splitting device 151; for instance, the second polarizing light-splitting device 152 is a light-splitting mirror which reflects the light beams with the P polarization state but allows the light beams with the S polarization state to pass. Therefore, the first green light source 121 provides the first green light beam L21 along a direction parallel to the second direction D2, and the second green light source 122 provides the second green light beam L22 along a direction parallel to the first direction D1. Accordingly, the second polarizing light-splitting device 152 reflects the second green light beam L22 but allows the first green light beam L21 to pass.

The third polarizing light-splitting device 153 is disposed on a transmission path of the first blue light beam L31 and a transmission path of the second blue light beam L32 and configured to allow one of the first blue light beam L31 and the second blue light beam L32 to pass but reflect the other. In detail, in the present embodiment, the third polarizing light-splitting device 153 is similar to the first polarizing light-splitting device 151; for instance, the third polarizing light-splitting device 153 is a light-splitting mirror which reflects the light beams with the P polarization state but allows the light beams with the S polarization state to pass. Therefore, the first blue light source 131 provides the first blue light beam L31 along a direction parallel to the second direction D2, and the second blue light source 132 provides the second blue light beam L32 along a direction parallel to the first direction D1. Accordingly, the third polarizing light-splitting device 153 reflects the second blue light beam L32 but allows the first blue light beam L31 to pass.

On the other hand, in the present embodiment, the illumination system 100 further includes a second light-splitting device 142 configured to allow the red light beams to pass but reflect the green light beams, and the first light-splitting device 141 is disposed between the second light-splitting device 142 and the light-homogenizing device 160 and configured to allow the red light beams and the green light beams to pass but reflect the blue light beams. In other words, in the present embodiment, the first red light beam L11 and the second red light beam L12 sequentially pass the second light-splitting device 142, the first light-splitting device 141, and the light-homogenizing device 160. The first green light beam L21 and the second green light beam L22 are reflected by the second light-splitting device 142 and pass the first light-splitting device 141 and the light-homogenizing device 160 in sequence. The first blue light beam L31 and the second blue light beam L32 are reflected by the first light-splitting device 141 and pass the light-homogenizing device 160. Therefore, in the present embodiment, the arrangement of replacing a full-length-wavelength-type reflective mirror with a polarizing light-splitting mirror allows the number of light modules of each color to be twice the number of light modules according to the related art. In addition, the combination of light beams of the same wavelength but different polarization states may alleviate the laser speckle phenomenon of the projection image and reduce the haze of the diffusion sheet, so as to improve the light-combining efficiency. In the previous embodiments, the illumination system 100 may be equipped with different types and different numbers of optical lenses according to the design of light paths to facilitate light beam transmission, which should however not be construed as limitations to the invention and will not be further explained hereinafter.

Figure 3:
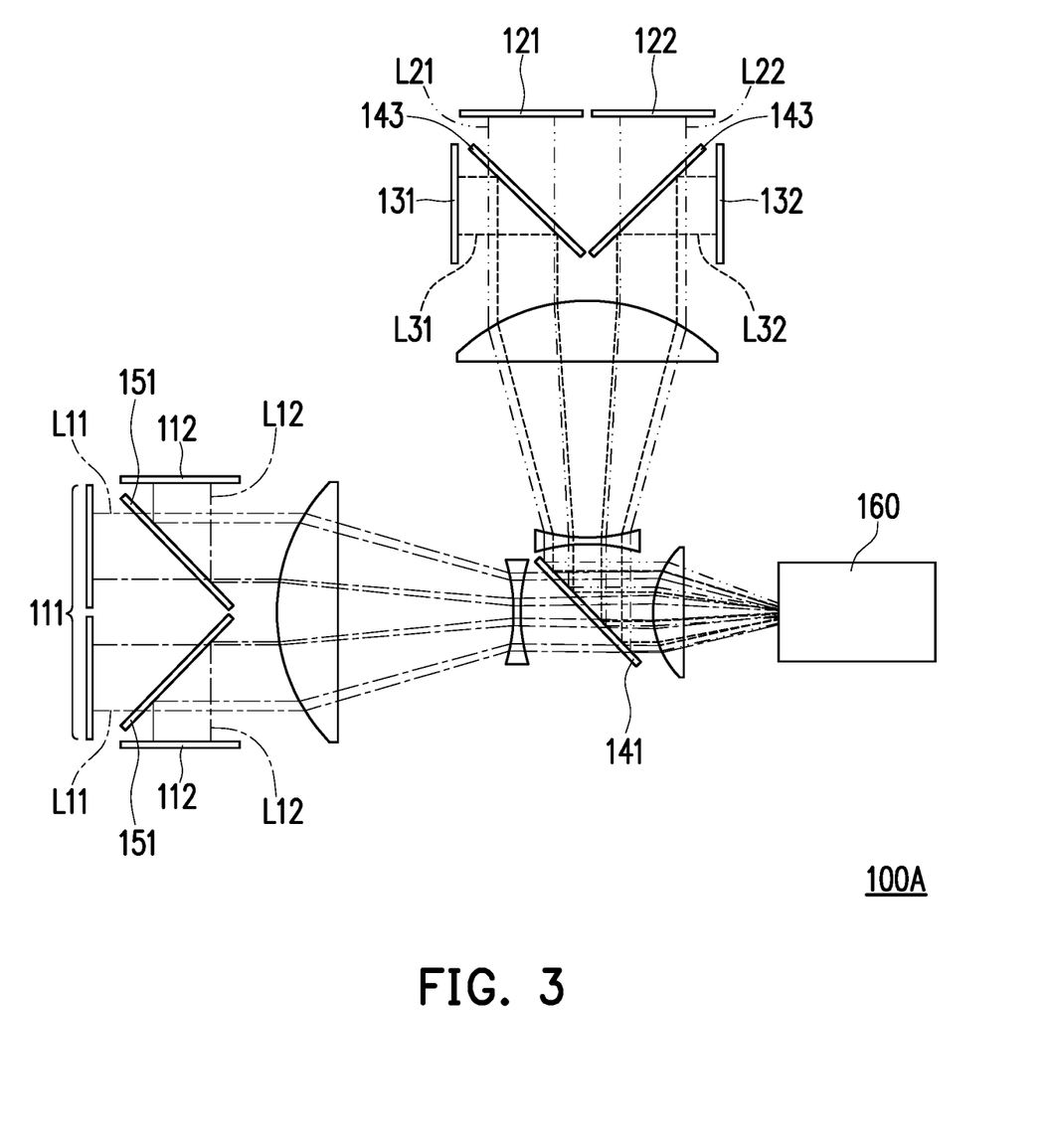
FIG. 3 is a schematic view of a projection apparatus according to another embodiment of the invention.

FIG. 3 is a schematic view of a projection apparatus according to another embodiment of the invention. With reference to FIG. 3, an illumination system 100A depicted in FIG. 3 is similar to the illumination system 100 depicted in FIG. 2, while the difference therebetween lies in that the second light-splitting device 142 depicted in FIG. 1 is omitted in the illumination system 10A, and the first light-splitting device 141 is configured to allow the red light beam to pass but reflect the green light beam and the blue light beam. In addition, according to the present embodiment, the first green light beam L21, the second green light beam L22, the first blue light beam L31, and the second blue light beam L32 share the same light-combining module; namely, one single light-combining module is formed. Thereby, the illumination system 100A provided in this embodiment may have the reduced number of optical devices, which further saves the space occupied by the system. In detail, in the light-combining module, the illumination system 100A is equipped with a third light-splitting device 143, e.g., a light-splitting mirror that reflects blue light beams, and the third light-splitting device 143 is configured to allow the green light beams to pass but reflect the blue light beams. Therefore, the first green light source 121 and the second green light source 122 may be configured to provide the first green light beam L21 and the second green light beam L22 along a direction parallel to second direction D2, and the first blue light source 131 and the second blue light source 132 may be configured to provide the first blue light beam L31 and the second blue light beam L32 along a direction parallel to the first direction D1. However, in other embodiments, the third light-splitting device 143 may also be a light-splitting mirror that reflects green light beams in response to the configurations of the light sources, and the third light-splitting device 143 may allow the blue light beams to pass but reflect the green light beams, which should however not be construed as limitations to the invention.

In the present embodiment, note that the number of light-emitting devices in the first red light source 111 and the second red light source 112 is twice the number of light-emitting devices in the first green light source 121 and the second green light source 122. The number of the light-emitting devices in the first red light source 111 and the second red light source 112 is twice the number of light-emitting devices in the first blue light source 131 and the second blue light source 132. Thereby, in the illumination system 100A provided in this embodiment, the illumination intensity of the red light beams may be improved, so as to achieve favorable optical effects.

Figure 4:
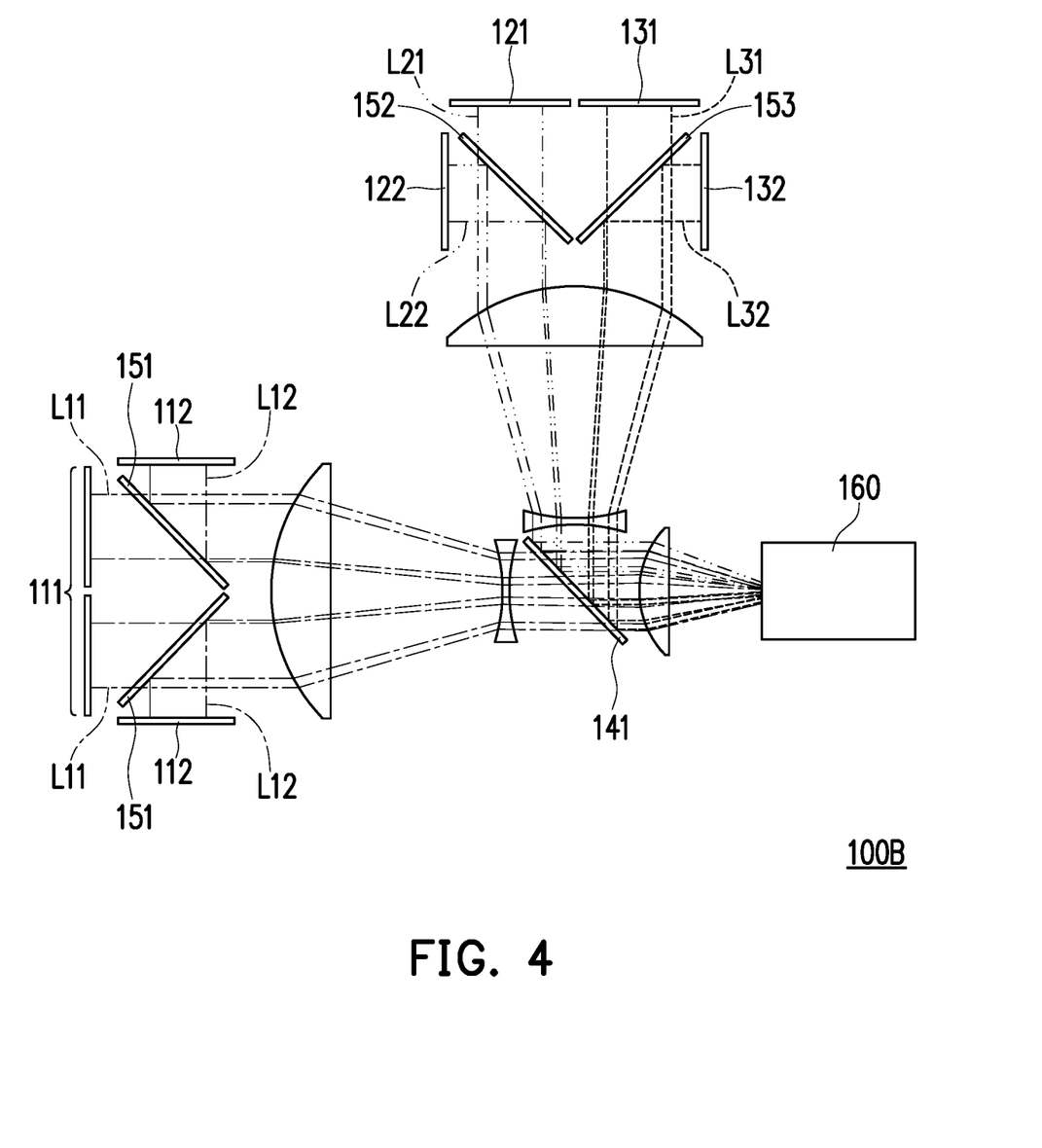
FIG. 4 is a schematic view of a projection apparatus according to another embodiment of the invention.

FIG. 4 is a schematic view of a projection apparatus according to another embodiment of the invention. With reference to FIG. 4, an illumination system 100B depicted in FIG. 4 is similar to the illumination system 100A depicted in FIG. 3, while the difference therebetween lies in that, in the light-combining module shared by the first green light beam L21, the second green light beam L22, the first blue light beam L31, and the second blue light beam L32 provided in this embodiment, the illumination system 100B is equipped with the second polarizing light-splitting device 152 and the third polarizing light-splitting device 153 shown in FIG. 1. The second polarizing light-splitting device 152 is configured to allow one of the first green light beam L21 and the second green light beam L22 to pass but reflect the other. The third polarizing light-splitting device 153 is configured to allow one of the first blue light beam L31 and the second blue light beam L32 to pass but reflect the other. References of the detailed implementation manner may be made to the implementation manner of the illumination system 100 depicted in FIG. 1, and no repetitive explanation will be provided hereinafter. As such, in the illumination system 100B provided in this embodiment, the illumination intensity of the red light beams may be improved, so as to achieve favorable optical effects. In addition, the combination of light beams of the same wavelength but different polarization states may alleviate the laser speckle phenomenon of the projection image and reduce the haze of the diffusion sheet, so as to improve the light-combining efficiency.

Figure 5:
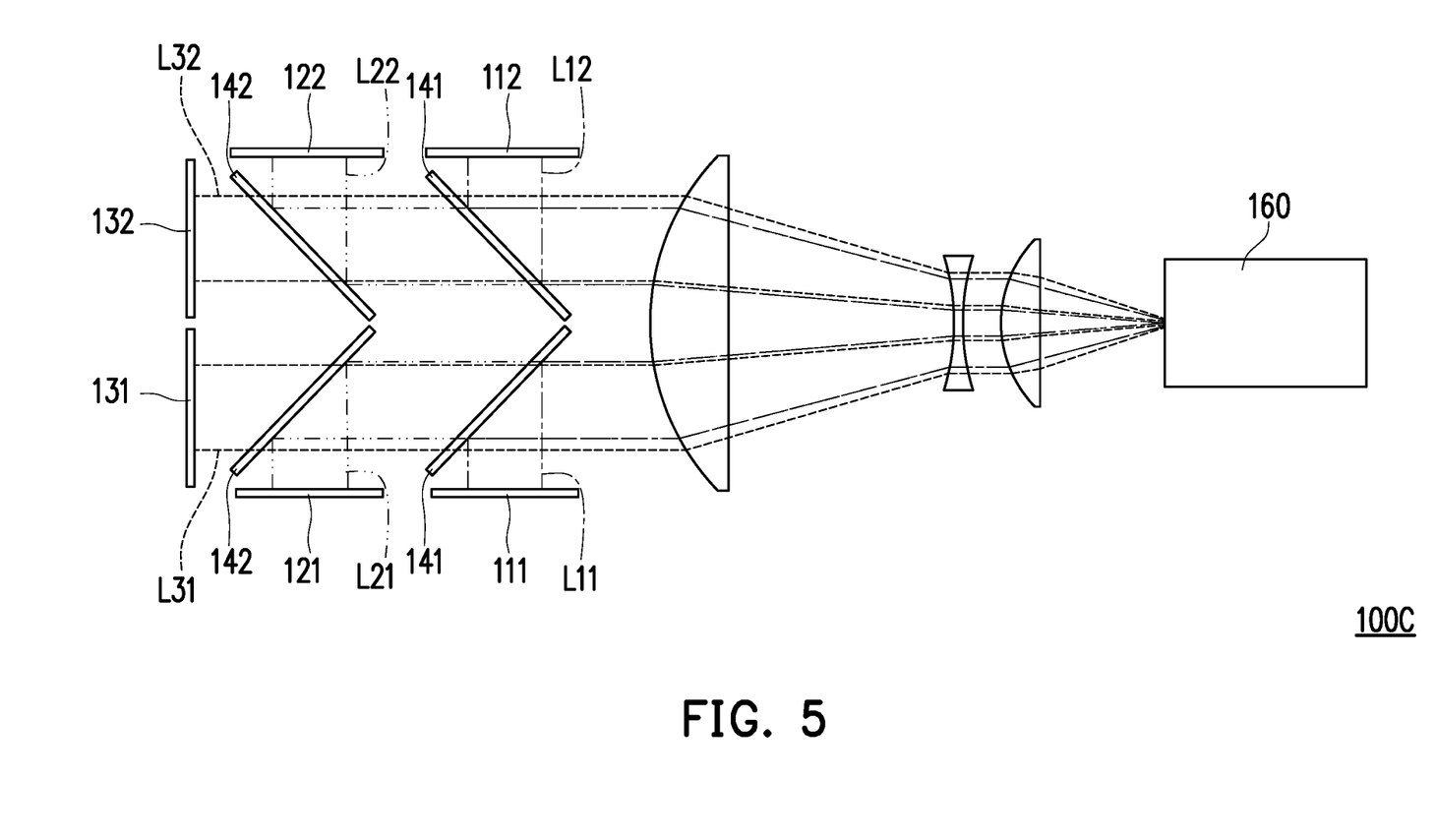
FIG. 5 is a schematic view of a projection apparatus according to another embodiment of the invention.

FIG. 5 is a schematic view of a projection apparatus according to another embodiment of the invention. With reference to FIG. 5, an illumination system 100C depicted in FIG. 5 is similar to the illumination system 100 depicted in FIG. 1, while the difference therebetween lies in that the first red light source 111, the second red light source 112, the first green light source 121, the second green light source 122, the first blue light source 131, and the second blue light source 132 together constitute one single light-combining module according to the present embodiment. The first light-splitting device 141 is disposed on the transmission paths of the first red light beam L11, the second red light beam L12, the first green light beam L21, the second green light beam L22, the first blue light beam L31, and the second blue light beam L32. The first light-splitting device 141 is, for instance, a light-splitting mirror that reflects red light beams, and the first light-splitting device 141 is configured to allow the first green light beam L21, the second green light beam L22, the first blue light beam L31, and the second blue light beam L32 to pass but reflect the first red light beam L11 and the second red light beam L12. The second light-splitting device 142 is disposed on the transmission paths of the first green light beam L21, the second green light beam L22, the first blue light beam L31, and the second blue light beam L32. The second light-splitting device 142 is, for instance, a light-splitting mirror that reflects green light beams, and the second light-splitting device 142 is configured to allow the first blue light beam L31 and the second blue light beam L32 to pass but reflect the first green light beam L21 and the second green light beam L22.

Thereby, the illumination system 100C provided in this embodiment may have the reduced number of optical devices, which further saves the space occupied by the system. In addition, in the illumination system 100C provided in the embodiment, the light beams of the same wavelength but different polarization states may be combined to alleviate the laser speckle phenomenon of the projection image, reduce the haze of the diffusion sheet, and further improve the light-combining efficiency. However, in different embodiments, the positions of the first red light source 111, the second red light source 112, the first green light source 121, the second green light source 122, the first blue light source 131, and the second blue light source 132 may be changed interactively, and the corresponding light-splitting devices may also be adjusted at the same time, which should not be construed as limitations to the invention.

Figure 6:
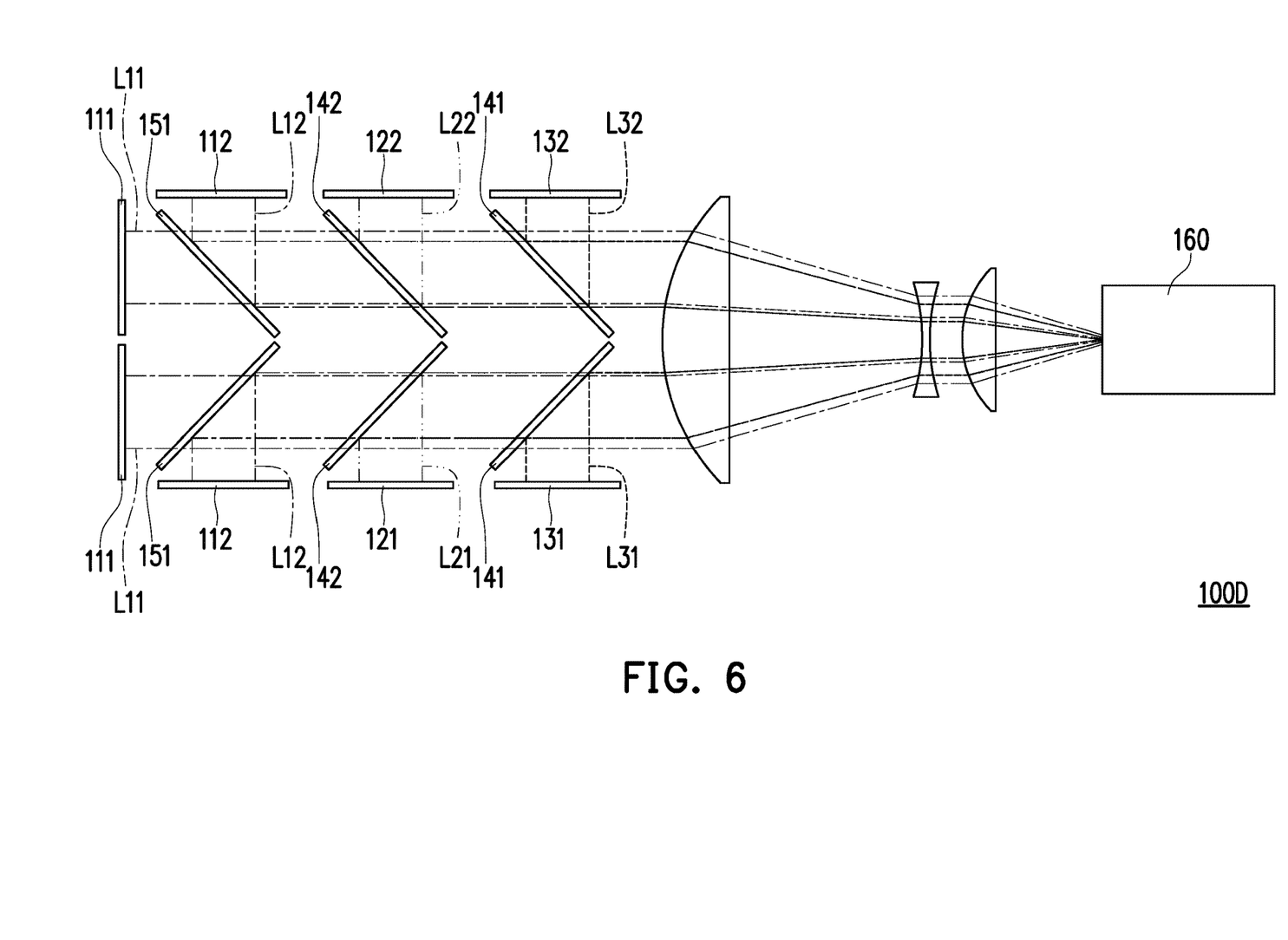
FIG. 6 is a schematic view of a projection apparatus according to another embodiment of the invention.

FIG. 6 is a schematic view of a projection apparatus according to another embodiment of the invention. With reference to FIG. 6, an illumination system 100D depicted in FIG. 6 is similar to the illumination system 100C depicted in FIG. 5, while the difference therebetween lies in that the first light-splitting device 141 provided in this embodiment is, for instance, a reflective blue light-splitting mirror configured to allow the first red light beam L11, the second red light beam L12, the first green light beam L21, and the second green light beam L22 to pass but reflect the first blue light beam L31 and the second blue light beam L32. The second light-splitting device 142 is disposed on the transmission paths of the first red light beam L11, the second red light beam L12, the first green light beam L21, and the second green light beam L22. The second light-splitting device 142 is, for instance, a light-splitting mirror that reflects green light beams and is configured to allow the first red light beam L11 and the second red light beam L12 to pass but reflect the first green light beam L21 and the second green light beam L22. In addition, the illumination system 100D provided in this embodiment further includes the first polarizing light-splitting device 151, and the first polarizing light-splitting device 151 is, for instance, a polarizing light-splitting mirror which reflects light beams with the P polarization state but allows light beams with the S polarization state to pass. The first polarizing light-splitting device 151 is disposed on the transmission paths of the first red light beam L11 and the second red light beam L12 and configured to allow the first red light beam L11 to pass but reflect the second red light beam L12. Thereby, the illumination system 100D provided in this embodiment may have the reduced number of optical devices, which further saves the space occupied by the system. Besides, in the illumination system 100D provided in this embodiment, the illumination intensity of the red light beams may be improved, so as to achieve favorable optical effects. In addition, in the illumination system 100D provided in the embodiment, the light beams of the same wavelength but with different polarization states may be combined to alleviate the laser speckle phenomenon of the projection image, reduce the haze of the diffusion sheet, and further improve the light-combining efficiency.

To sum up, one or more embodiments of the invention have at least one of the following advantages or effects. In the illumination system and the projection apparatus provided in one or more embodiments of the invention, the illumination system includes the first red light source, the second red light source, the first green light source, the second green light source, the first blue light source, and the second blue light source respectively configured to provide the first red light beam, the second red light beam, the first green light beam, the second green light beam, the first blue light beam, and the second blue light beam with different polarization states and generate the illumination beam by the light-splitting device. Thereby, the combination of the light beams of the same wavelength but different polarization states may alleviate the laser speckle phenomenon of the projection image, and there is no need to utilize the diffusion sheet with high haze to improve the light-combining efficiency. In addition, the number of the light sources in the illumination system is twice the number of the light sources in the conventional illumination system, and therefore the light source utilization efficiency may be enhanced.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising a first red light source, a second red light source, a first green light source, a second green light source, a first blue light source, a second blue light source, a first light-splitting device and a light-homogenizing device, wherein:
   the first red light source is configured to provide a first red light beam with a first polarization state,
   the second red light source is configured to provide a second red light beam with a second polarization state,
   the first green light source is configured to provide a first green light beam with the first polarization state,
   the second green light source is configured to provide a second green light beam with the second polarization state,
   the first blue light source is configured to provide a first blue light beam with the first polarization state,
   the second blue light source is configured to provide a second blue light beam with the second polarization state,
   the first light-splitting device is disposed on transmission paths of the first red light beam, the second red light beam, the first green light beam, the second green light beam, the first blue light beam, and the second blue light beam and is configured to form an illumination beam, and
   the light-homogenizing device is disposed on a transmission path of the illumination beam, wherein the first light-splitting device allows the first red light beam and the second red light beam to pass but reflects the first blue light beam and the second blue light beam or allows the first blue light beam and the second blue light beam to pass but reflects the first red light beam and the second red light beam.

2. The illumination system according to claim 1, further comprising a first polarizing light-splitting device disposed on the transmission path of the first red light beam and the transmission path of the second red light beam and configured to allow one of the first red light beam and the second red light beams to pass but reflect the other.

3. The illumination system according to claim 2, further comprising a second polarizing light-splitting device and a third polarizing light-splitting device, wherein:
   the second polarizing light-splitting device is disposed on the transmission path of the first green light beam and the transmission path of the second green light beam and configured to allow one of the first green light beam and the second green light beam to pass but reflect the other, and
   the third polarizing light-splitting device is disposed on the transmission path of the first blue light beam and on the transmission path of the second blue light beam and configured to allow one of the first blue light beam and the second blue light beam to pass but reflect the other.

4. The illumination system according to claim 1, further comprising a second light-splitting device, wherein: the second light-splitting device is configured to allow the first red light beam and the second red light beam to pass but reflect the first green light beam and the second green light beam, and
   the first light-splitting device is disposed between the second light-splitting device and the light-homogenizing device and is configured to allow the first red light beam, the second red light beam, the first green light beam and the second green light beam to pass but reflect the first blue light beam and the second blue light beam.

5. The illumination system according to claim 1, wherein the first light-splitting device is configured to allow the first red light beam and the second red light beam to pass but reflect the first green light beam, the second green light beam, the first blue light beam and the second blue light beam.

6. The illumination system according to claim 1, further comprising a second light-splitting device configured to allow the first blue light beam and the second blue light beam to pass but reflect the first green light beam and the second green light beam, wherein:
   the first light-splitting device is disposed between the second light-splitting device and the light-homogenizing device and is configured to allow the first green light beam, the second green light beam, the first blue light beam and the second blue light beam to pass but reflect the first red light beam and the second red light beam.

7. The illumination system according to claim 1, wherein one of the first red light beam and the second red light beam is provided along a direction parallel to a first direction, the other of the first red light beam and the second red light beam is provided along a direction parallel to a second direction, one of the first green light beam and the second green light beam is provided in the direction parallel to the first direction, the other of the first green light beam and the second green light beam is provided in the direction parallel to the second direction, one of the first blue light beam and the second blue light beam is provided in the direction parallel to the first direction, the other of the first blue light beam and the second blue light beam is provided in the direction parallel to the second direction, and the first direction is perpendicular to the second direction.

8. The illumination system according to claim 1, wherein the number of light-emitting devices in the first red light source and the second red light source is twice the number of light-emitting devices in the first green light source and the second green light source, and the number of the light-emitting devices in the first red light source and the second red light source is twice the number of light-emitting devices in the first blue light source and the second blue light source.

9. The illumination system according to claim 1, wherein the first green light source, the second green light source, the first blue light source, and the second blue light source constitute one single light-combining module.

10. The illumination system according to claim 1, wherein the first red light source, the second red light source, the first green light source, the second green light source, the first blue light source, and the second blue light source constitute one single light-combining module.

11. A projection apparatus, comprising an illumination system, at least one light valve, and a projection lens, wherein:
    the illumination system comprises a first red light source, a second red light source, a first green light source, a second green light source, a first blue light source, a second blue light source, a first light-splitting device, and a light-homogenizing device, wherein:

the first red light source is configured to provide a first red light beam with a first polarization state, the second red light source is configured to provide a second red light beam with a second polarization state, the first green light source is configured to provide a first green light beam with the first polarization state, the second green light source is configured to provide a second green light beam with the second polarization state, the first blue light source is configured to provide a first blue light beam with the first polarization state, the second blue light source is configured to provide a second blue light beam with the second polarization state, the first light-splitting device is disposed on transmission paths of the first red light beam, the second red light beam, the first green light beam, the second green light beam, the first blue light beam, and the second blue light beam and configured to form an illumination beam, and the light-homogenizing device is disposed on a transmission path of the illumination beam;

the at least one light valve is disposed on the transmission path of the illumination beam and configured to convert the illumination beam to an image beam; and the projection lens is disposed on a transmission path of the image beam and configured to project the image beam out of the projection apparatus, wherein the first light-splitting device allows the first red light beam and the second light beam to pass but reflects the first blue light beam and the second blue light beam or allows the first blue light beam and the second blue light beam to pass but reflects the first red light beam and the second red light beam.

12. The projection apparatus according to claim 11, wherein the illumination system further comprises a first polarizing light-splitting device disposed on the transmission path of the first red light beam and the transmission path of the second red light beam and configured to allow one of the first red light beam and the second red light beam to pass but reflect the other.

13. The projection apparatus according to claim 12, wherein the illumination system further comprises a second polarizing light-splitting device and a third polarizing light-splitting device, wherein:

the second polarizing light-splitting device is disposed on the transmission path of the first green light beam and the transmission path of the second green light beam and configured to allow one of the first green light beam and the second green light beam to pass but reflect the other, and the third polarizing light-splitting device is disposed on the transmission path of the first blue light beam and on the transmission path of the second blue light beam and configured to allow one of the first blue light beam and the second blue light beam to pass but reflect the other.

14. The projection apparatus according to claim 11, wherein the illumination system further comprises a second light-splitting device, wherein the second light-splitting device is configured to allow the first red light beam and the second red light beam to pass but reflect the first green light beam and the second green light beam, and the first light-splitting device is disposed between the second light-splitting device and the light-homogenizing device and is configured to allow the first red light beam, the second red light beam, the first green light beam and the second green light beam to pass but reflect the first blue light beam and the second blue light beam.

15. The projection apparatus according to claim 11, wherein the first light-splitting device is configured to allow the first red light beam and the second red light beam to pass but reflect the first green light beam, the second green light beam, the first blue light beam and the second blue light beam.

16. The projection apparatus according to claim 11, wherein the illumination system further comprises a second light-splitting device configured to allow the first blue light beam and the second blue light beam to pass but reflect the first green light beam and the second green light beam, wherein:

the first light-splitting device is disposed between the second light-splitting device and the light-homogenizing device and is configured to allow the first green light beam, the second green light beam, the first blue light beam and the second blue light beam to pass but reflect the first red light beam and the second red light beam.

17. The projection apparatus according to claim 11, wherein one of the first red light beam and the second red light beam is provided along a direction parallel to a first direction, the other of the first red light beam and the second red light beam is provided along a direction parallel to a second direction, one of the first green light beam and the second green light beam is provided in the direction parallel to the first direction, the other of the first green light beam and the second green light beam is provided in the direction parallel to the second direction, one of the first blue light beam and the second blue light beam is provided in the direction parallel to the first direction, the other of the first blue light beam and the second blue light beam is provided in the direction parallel to the second direction, and the first direction is perpendicular to the second direction.

18. The projection apparatus according to claim 11, wherein the number of light-emitting devices in the first red light source and the second red light source is twice the number of light-emitting devices in the first green light source and the second green light source, and the number of the light-emitting devices in the first red light source and the second red light source is twice the number of light-emitting devices in the first blue light source and the second blue light source.

19. The projection apparatus according to claim 11, wherein the first green light source, the second green light source, the first blue light source, and the second blue light source constitute one single light-combining module.

20. The projection apparatus according to claim 11, wherein the first red light source, the second red light source, the first green light source, the second green light source, the first blue light source, and the second blue light source constitute one single light-combining module.

* * * * *